United States Patent
Hong et al.

(10) Patent No.: US 12,039,422 B2
(45) Date of Patent: Jul. 16, 2024

(54) METHOD AND APPARATUS FOR GENERATING APPLICATION IDENTIFICATION MODEL

(71) Applicant: Huawei Technologies Co., Ltd., Shenzhen (CN)

(72) Inventors: Hanshu Hong, Nanjing (CN); Feng Dong, Nanjing (CN); Wei Song, Nanjing (CN); Qingping Yang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 808 days.

(21) Appl. No.: 17/162,669

(22) Filed: Jan. 29, 2021

(65) Prior Publication Data
US 2021/0158217 A1 May 27, 2021

Related U.S. Application Data

(63) Continuation of application No. PCT/CN2019/094641, filed on Jul. 4, 2019.

(30) Foreign Application Priority Data

Jul. 30, 2018 (CN) .......................... 201810852134.4

(51) Int. Cl.
*G06N 20/00* (2019.01)
*H04L 41/14* (2022.01)
*H04L 43/022* (2022.01)

(52) U.S. Cl.
CPC ........... *G06N 20/00* (2019.01); *H04L 41/145* (2013.01); *H04L 43/022* (2013.01)

(58) Field of Classification Search
CPC ..... H04L 41/145; H04L 69/22; H04L 43/022; H04L 67/141; H04L 63/0236; H04L 41/14; H04L 9/40; G06N 20/00
See application file for complete search history.

(56) References Cited

U.S. PATENT DOCUMENTS

2017/0124763 A1 5/2017 De Pasquale
2017/0289106 A1 10/2017 Chen et al.
(Continued)

FOREIGN PATENT DOCUMENTS

CN 101695035 A 4/2010
CN 105046270 A 11/2015
(Continued)

OTHER PUBLICATIONS

Chuan, L. et al., "Peer to Peer Traffic Identification Using Support Vector Machine and Bat-Inspired Optimization Algorithm", 12th International Conference on Computer Science & Education (ICCSE 2017), Aug. 22-25, 2017, pp. 489-495.

*Primary Examiner* — Tonia L Dollinger
*Assistant Examiner* — Mehulkumar J Shah
(74) *Attorney, Agent, or Firm* — Slater Matsil, LLP

(57) ABSTRACT

Embodiments of this application disclose a method and an apparatus for generating an application identification model. The method includes: obtaining Y data packets, where the Y data packets correspond to P applications, an $i^{th}$ application in the P applications corresponds to M(i) data packets, and $Y=\Sigma_{i=1}^{P}M(i)$, $1 \le i \le P$; extracting a target parameter of each of the M(i) data packets of each of the P applications to obtain M(i) samples, where the target parameter indicates information about a session connection established between the $i^{th}$ application and a server that provides the $i^{th}$ application; and training an initial identification model based on the M(i) samples of each of the P applications, to obtain a first application identification model, where the first application identification model is used to determine, based on a target parameter of a data packet, an application corresponding to the data packet.

16 Claims, 7 Drawing Sheets

(56) References Cited

U.S. PATENT DOCUMENTS

| | | | | |
|---|---|---|---|---|
| 2018/0150635 A1* | 5/2018 | Melvin | ............... | G06N 20/00 |
| 2019/0180028 A1* | 6/2019 | Seo | ............... | G06F 21/602 |
| 2020/0322237 A1* | 10/2020 | Luo | ............... | H04L 43/045 |

FOREIGN PATENT DOCUMENTS

| | | | |
|---|---|---|---|
| CN | 105516027 A | 4/2016 | |
| CN | 105550295 A | 5/2016 | |
| CN | 106778820 A | 5/2017 | |
| CN | 107437088 A | 12/2017 | |
| CN | 107809343 A | 3/2018 | |
| CN | 107818077 A | 3/2018 | |
| EP | 3331206 A1 | 6/2018 | |

* cited by examiner

METHOD AND APPARATUS FOR GENERATING APPLICATION IDENTIFICATION MODEL

CROSS-REFERENCE TO RELATED APPLICATIONS

This application is a continuation of International Application No. PCT/CN2019/094641, filed on Jul. 4, 2019, which claims priority to Chinese Patent Application No. 201810852134.4, filed on Jul. 30, 2018. All of the aforementioned applications are hereby incorporated by reference in their entireties.

TECHNICAL FIELD

Embodiments of this application relate to the field of communications technologies, and in particular, to a method and an apparatus for generating an application identification model.

BACKGROUND

Currently, a port detection technology is mainly used to detect data traffic. The port detection technology may identify, by detecting a port number in a data packet of traffic, a protocol type corresponding to the data packet.

To implement the port detection technology, a mapping relationship between a port number and a protocol type needs to be pre-registered with an internet assigned numbers authority (IANA). Then, the protocol type corresponding to the data packet may be determined according to the mapping relationship. For example, it is assumed that a mapping relationship between a port number, for example, 21, and a protocol type, for example, a File Transfer Protocol (FTP), is pre-registered with the IANA, and the network device may determine that a protocol type corresponding to a data packet including the port number 21 is FTP, that is, the data packet is an FTP data packet. The port detection technology can identify only a protocol type corresponding to a data packet, but cannot identify application software corresponding to the data packet. Therefore, the port detection technology cannot meet a requirement of a current market.

SUMMARY

This application provides a method and an apparatus for generating an application identification model, to determine an application corresponding to a data packet.

According to a first aspect, this application provides a method for generating an application identification model. The method includes: obtaining Y data packets, where the Y data packets correspond to P applications, an $i^{th}$ application in the P applications corresponds to M(i) data packets, and $Y=\Sigma_{i=1} M(i)$, $1 \leq i \leq P$; extracting a target parameter of each of the M(i) data packets of each of the P applications to obtain M(i) samples, where the target parameter indicates information about a session connection established between the $i^{th}$ application and a server that provides the $i^{th}$ application; and training an initial identification model based on the M(i) samples of each of the P applications, to obtain a first application identification model, where the first application identification model is used to determine, based on a target parameter of a data packet, an application corresponding to the data packet.

In the first aspect, in this application, Y data packets may be obtained, M(i) samples of each of P applications are extracted from the Y data packets based on a mapping relationship between the Y data packets and the P applications, and then the initial identification model is trained based on the M(i) samples of each of the P applications to obtain the first application identification model. Therefore, in this application, an application corresponding to an unknown data packet may be determined by using the generated first application identification model, to accurately identify data traffic.

In a possible implementation of the first aspect, after that the initial identification model is trained based on the M(i) samples of each of the P applications to obtain the first application identification model, the method further includes: collecting N(i) data packets corresponding to the $i^{th}$ application; extracting a target parameter of each of the N(i) data packets to obtain N(i) samples; identifying the N(i) samples by using the first application identification model, to obtain an identification result, where the identification result indicates that I(i) samples correspond to the $i^{th}$ application, I(i) is a positive integer, and I(i) is less than or equal to N; determining whether a ratio of I(i) to N(i) is greater than a first threshold; when the ratio of I(i) to N(i) is greater than the first threshold, storing the first application identification model; and when the ratio of I(i) to N(i) is less than the first threshold, adjusting the initial identification model, and training the adjusted initial identification model based on the M(i) samples of each of the P applications, to generate a second application identification model, where identification accuracy of the second application identification model is greater than identification accuracy of the first application identification model.

In this application, identification accuracy of the first application identification model may be tested. If the identification accuracy of the first application identification model meets a criterion, the first application identification model is stored. If the identification accuracy of the first application identification model does not meet the criterion, the initial identification model is adjusted, and the adjusted initial identification model is trained based on the M(i) samples of each of the P applications, to generate the second application identification model. In this way, the second application identification model with higher identification accuracy can be obtained. Therefore, in this application, the initial identification model may be adjusted based on an actual requirement, to generate the second application identification model with higher identification accuracy.

In a possible implementation of the first aspect, after the extracting a target parameter of each of the M(i) data packets of each of the P applications to obtain M(i) samples, the method further includes: determining whether M(i) is less than a second threshold, where the second threshold is used to determine whether a new sample needs to be added to the $i^{th}$ application. That the initial identification model is trained based on the M(i) samples of each of the P applications to obtain the first application identification model includes: when M(i) is less than the second threshold, obtaining a quantity X(i) of to-be-added samples of the $i^{th}$ application, where X(i) is a positive integer; generating X(i) new samples of the $i^{th}$ application based on the M(i) samples; and training the initial recognition model based on the M(i) samples of each of the P applications and the X(i) new samples, to obtain the first application recognition model; or when M(i) is greater than the second threshold, training the initial identification model based on the M(i) samples of each of the P applications, to obtain the first application identification model.

In this application, applications with a comparatively small quantity of samples can be detected from the P applications, and the quantity of samples of these applications is increased, to ensure that the quantity of samples for training the initial identification model meets a requirement.

In a possible implementation of the first aspect, the generating $X(i)$ new samples of the $i^{th}$ application based on the $M(i)$ samples includes: generating $X(i)/M(i)$ new samples for each sample of the $M(i)$ samples to obtain the $X(i)$ new samples. The generating $X(i)/M(i)$ new samples for each sample of the $M(i)$ samples to obtain the $X(i)$ new samples includes: using each of the $M(i)$ samples as a reference sample; obtaining, from the $M(i)$ samples, $X(i)/M(i)$ samples having a minimum hamming distance from the reference sample; and generating $X(i)/M(i)$ new samples corresponding to the reference sample based on the reference sample and the $X(i)/M(i)$ samples.

In a possible implementation of the first aspect, the obtaining a quantity $X(i)$ of to-be-added samples of the $i^{th}$ application includes any one of the following manners: (a) obtaining a preset quantity $X(i)$ of to-be-added samples; (b) obtaining a preset third threshold, and calculating a difference between the third threshold and $M(i)$ to obtain the quantity $X(i)$ of to-be-added samples of the $i^{th}$ application, where the third threshold indicates a minimum quantity of required samples for generating the application identification model; and (c) determining an average quantity $Y/P$ of data packets of each of the P applications and an expected ratio $R(i)$ of the $i^{th}$ application, where the expected ratio $R(i)$ is used to indicate a ratio of an expected quantity $E(i)$ of samples of the $i^{th}$ application to the average quantity $Y/P$ of the data packets of each application; calculating the expected quantity $E(i)$ of samples of the $i^{th}$ application based on the average quantity $Y/P$ of the data packets of each of the P applications and the expected ratio $R(i)$ of the $i^{th}$ application; and calculating a difference between $E(i)$ and $M(i)$ to obtain the quantity $X(i)$ of to-be-added samples of the $i^{th}$ application.

In a possible implementation of the first aspect, after that the initial identification model is trained based on the $M(i)$ samples of each of the P applications to obtain the first application identification model, the method further includes: obtaining a target data packet; extracting a target parameter of the target data packet; and identifying the target parameter of the target data packet by using the first application identification model, to obtain a target identification result, where the target identification result is used to indicate an application corresponding to the target data packet.

According to a second aspect, this application provides an apparatus for generating an application identification model. The apparatus includes: a first obtaining module, configured to obtain Y data packets, where the Y data packets correspond to P applications, and an $i^{th}$ application in the P applications corresponds to $M(i)$ data packets, and $Y=\Sigma_{i=1}^{P}M(i)$, $1 \le i \le P$; a first extraction module, configured to extract a target parameter of each of the $M(i)$ data packets of each of the P applications to obtain $M(i)$ samples, where the target parameter indicates information about a session connection established between the $i^{th}$ application and a server that provides the $i^{th}$ application; a first training module, configured to train an initial identification model based on the $M(i)$ samples of each of the P applications, to obtain a first application identification model, where the first application identification model is used to determine, based on a target parameter of a data packet, an application corresponding to the data packet.

In a possible implementation of the second aspect, the apparatus further includes: a collection module, configured to collect $N(i)$ data packets corresponding to the $i^{th}$ application; a second extraction module, configured to extract a target parameter of each of the $N(i)$ data packets to obtain $N(i)$ samples; a first identification module, configured to identify the $N(i)$ samples by using the first application identification model, to obtain an identification result, where the identification result indicates that $I(i)$ samples correspond to the $i^{th}$ application, $I(i)$ is a positive integer, and $I(i)$ is less than or equal to N; a determining module, configured to determine whether a ratio of $I(i)$ to $N(i)$ is greater than a first threshold; a storage module, configured to: when the ratio of $I(i)$ to $N(i)$ is greater than the first threshold, store the first application identification model; and a second training module, configured to: when the ratio of $I(i)$ to $N(i)$ is less than the first threshold, adjust the initial identification model, and train the adjusted initial identification model based on the $M(i)$ samples of each of the P applications, to generate a second application identification model, where identification accuracy of the second application identification model is greater than identification accuracy of the first application identification model.

In a possible implementation of the second aspect, the apparatus further includes: a judging module, configured to determine whether $M(i)$ is less than a second threshold, where the second threshold is used to determine whether a new sample needs to added to the $i^{th}$ application; and a first training module, specifically configured to: when $M(i)$ is less than the second threshold, obtain a quantity $X(i)$ of to-be-added samples of the $i^{th}$ application, where $X(i)$ is a positive integer; generate $X(i)$ new samples of the $i^{th}$ application based on the $M(i)$ samples; and train the initial recognition model based on the $M(i)$ samples of each of the P applications and the $X(i)$ new samples, to obtain the first application recognition model; or when $M(i)$ is greater than the second threshold, train the initial identification model based on the $M(i)$ samples of each of the P applications, to obtain the first application identification model.

In a possible implementation of the second aspect, the first training module is specifically configured to generate $X(i)/M(i)$ new samples for each sample of the $M(i)$ samples to obtain the $X(i)$ new samples. The first training module is specifically configured to: use each of the $M(i)$ samples as a reference sample; obtain, from the $M(i)$ samples, $X(i)/M(i)$ samples having a minimum hamming distance from the reference sample; and generate $X(i)/M(i)$ new samples corresponding to the reference sample based on the reference sample and the $X(i)/M(i)$ samples.

In a possible implementation of the second aspect, the first training module is specifically configured to obtain a preset quantity $X(i)$ of to-be-added samples. Alternatively, the first training module is specifically configured to: obtain a preset third threshold, and calculate a difference between the third threshold and $M(i)$ to obtain the quantity $X(i)$ of to-be-added samples of the $i^{th}$ application, where the third threshold indicates a minimum quantity of required samples for generating the application identification model. Alternatively, the first training module is specifically configured to: determine an average quantity $Y/P$ of data packets of each of the P applications and an expected ratio $R(i)$ of the $i^{th}$ application, where the expected ratio $R(i)$ is used to indicate a ratio of an expected quantity $E(i)$ of samples of the $i^{th}$ application to the average quantity $Y/P$ of the data packets of each application; calculate the expected quantity $E(i)$ of samples of the $i^{th}$ application based on the average quantity $Y/P$ of the data packets of each of the P applications and the expected ratio R(i) of the $i^{th}$ application; and calculate a difference between E(i) and M(i) to obtain the quantity X(i) of to-be-added samples of the $i^{th}$ application.

In a possible implementation of the second aspect, the apparatus further includes: a second obtaining module, configured to obtain a target data packet; and a third extraction module, configured to extract a target parameter of the target data packet. The second identification module is configured to identify the target parameter of the target data packet by using the first application identification model, to obtain a target identification result, where the target identification result is used to indicate an application corresponding to the target data packet.

DETAILED DESCRIPTION OF ILLUSTRATIVE EMBODIMENTS

Figure 1:
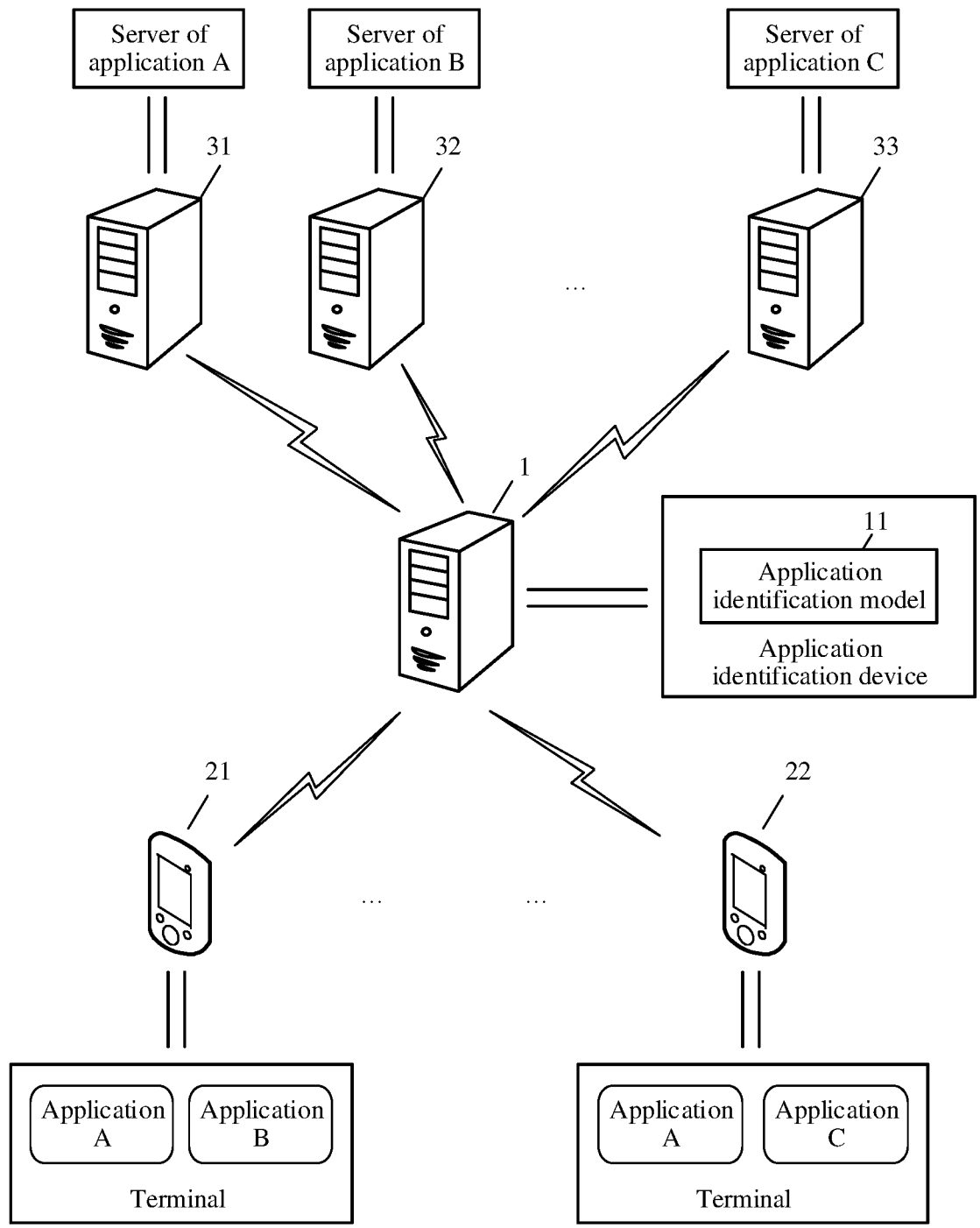
FIG. 1 is a schematic diagram of an application scenario of an application identification model according to an embodiment of this application.

FIG. 1 is a schematic diagram of an application scenario of an application identification model according to an embodiment of this application. FIG. 1 mainly shows three types of devices. The three types of devices are an application identification device, a terminal, and an application server.

In the embodiment shown in FIG. 1, an application identification device 1 includes an application identification model 11. The application identification model 11 is generated by using a method for generating an application identification model provided in this embodiment of this application. The application identification model 11 is used to identify an application corresponding to a data packet that passes through the application identification device 1.

The application identification model 11 may be deployed in different types of servers according to a service requirement. For example, the application identification model 11 may be deployed in various network devices such as a server, a router, a switch, or a firewall of a network operator, so that the network operator may separately charge traffic for different applications.

An application A and an application B are installed on a terminal 21, and the application A and an application C are installed on a terminal 22. The application A, the application B, and the application C may be various types of application software such as video software, music software, and instant communications software. Certainly, more applications may be installed on the terminal 21 and the terminal 22.

The application A may establish a session connection to a server 31 of the application A. The application A may send an uplink data packet to the server 31 of the application A by using the session connection, and the application A may also receive, by using the session connection, a downlink data packet sent by the server 31 of the application A. Both the uplink data packet and the downlink data packet that are generated based on the session connection pass through the application identification device 1. The application identification model 11 in the application identification device 1 may identify that the uplink data packet and the downlink data packet that are generated based on the session connection correspond to the application A.

Similarly, the application B may establish a session connection to a server 32 of the application B, and the application C may also establish a session connection to a server 33 of the application C. Both the uplink data packet and the downlink data packet that are generated based on different session connections pass through the application identification device 1. The application identification model 11 in the application identification device 1 may identify an application to which the uplink data packet and the downlink data packet that are generated based on the different session connections correspond.

FIG. 1 describes an application scenario of an application identification model. The following describes how to generate an application identification model.

Figure 2:
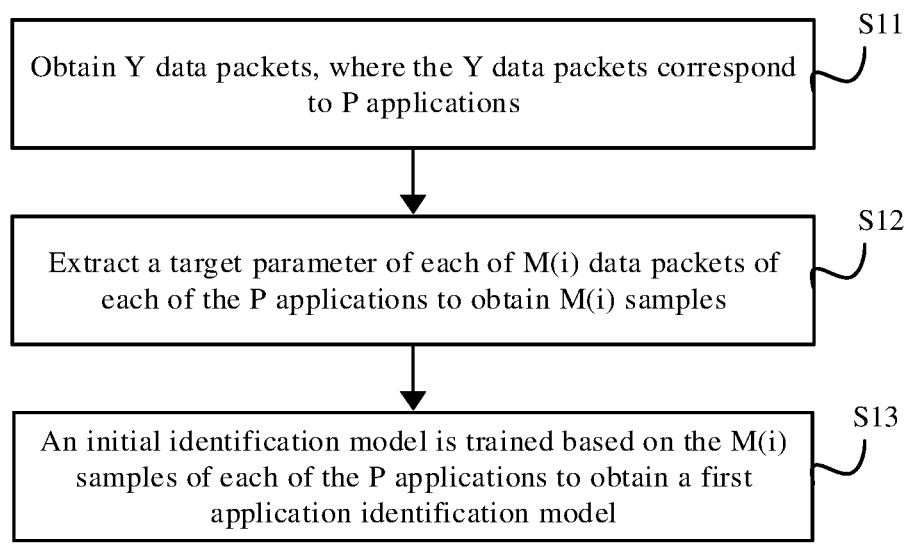
FIG. 2 is a flowchart of a method for generating an application identification model according to an embodiment of this application.

FIG. 2 is a flowchart of a method for generating an application identification model according to an embodiment of this application. The application identification model generated by using the method shown in FIG. 2 may be used to determine an application corresponding to a data packet. The method shown in FIG. 2 may be applied to various network devices such as a server, a router, a switch, or a firewall. The method shown in FIG. 2 includes the following steps.

Step S11: Obtain Y data packets, where the Y data packets correspond to P applications, an $i^{th}$ application in the P applications corresponds to M(i) data packets, and $Y=\Sigma_{i=1}^{P}M(i)$, $1 \leq i \leq P$.

When the method shown in FIG. 2 is applied to a network device, to generate an application identification model in the network device, the network device needs to prestore an initial identification model. The initial identification model may be a convolutional neural network (CNN) or other types of deep learning networks. Then, the network device further needs to collect some samples, to train the initial identification model based on these samples, to obtain the application identification model.

In step S11, the network device obtains Y data packets in a period of time, where the Y data packets correspond to P applications, and both Y and P are positive integers. M(i) is a quantity of data packets corresponding to an $i^{th}$ application in the P applications.

Referring to FIG. 1, for example, it is assumed that an initial identification model is prestored in the application identification device 1. To collect samples, the application identification device 1 obtains a total of 2000 data packets within one minute, that is, Y is 2000. The 2000 data packets correspond to three applications, that is, P is 3. In the three applications, a first application is the application A, a second application is the application B, and a third application is the application C. A quantity of data packets of the application A is 1000, a quantity of data packets of the application B is 800, and a quantity of data packets of the application C is 200, that is, M(1) is 1000, M(2) is 800, and M(3) is 200.

In step S11, each of the Y data packets includes a target parameter, and the target parameter indicates information about a session connection established between the $i^{th}$ application and a server that provides the $i^{th}$ application.

Referring to FIG. 1, for example, after a session connection is established between the application A of the terminal 21 and the server 31 of the application A, the application identification device 1 obtains the data packet including the target parameter from the session connection. If the first data packet of an uplink data stream of the session connection includes the target parameter, the application identification device 1 obtains the first data packet of the uplink data stream of the session connection. If both the first data packet of the uplink data stream and the first data packet of a downlink data stream of the session connection include the target parameter, the application identification device 1 obtains the first data packet of the uplink data stream and the first data packet of the downlink data stream of the session connection. The application identification device 1 needs to obtain all the data packets that pass through the application identification device 1 provided that the data packets include the target parameter, to obtain Y data packets.

Step S12: Extract a target parameter of each of the M(i) data packets of each of the P applications to obtain M(i) samples, where the target parameter indicates information about a session connection established between the $i^{th}$ application and a server that provides the $i^{th}$ application.

The target parameter may include port information, network address information, domain name information, an application layer protocol, and the like.

Generally, some bytes of each data packet are used to store the target parameter. For example, assuming that the first 128 bytes of each data packet are used to store the target parameter, the first 128 bytes of each of the M(i) data packets of each of the P applications may be extracted to obtain M(i) samples. Certainly, the target parameter may also be stored in another location of each data packet.

In step S12, one sample may be obtained based on a target parameter of one data packet, or one sample may be obtained based on target parameters of two data packets.

For example, referring to FIG. 1, Table 1, and Table 2, Table 1 shows a schematic structural diagram of each of M(i) data packets of each of the P applications, and Table 2 shows a schematic structural diagram of a sample that is obtained after a target parameter is extracted from one data packet. Table 1 and Table 2 show a case in which one sample is obtained by extracting a target parameter of one data packet. If first Z bytes of a first data packet of an uplink data stream of a session connection include the target parameter, the application identification device 1 obtains the first Z bytes of the first data packet of the uplink data stream of the session connection, and uses the Z bytes as one sample.

TABLE 1

| Target parameter | | Other data | |
|---|---|---|---|
| $1^{st}$ byte | ... $Z^{th}$ byte | ... | Last byte |

TABLE 2

| 1 sample | | |
|---|---|---|
| $1^{st}$ byte | ... | $Z^{th}$ byte |

For another example, referring to FIG. 1, Table 3, and Table 4, Table 3 shows a schematic structural diagram of each of M(i) data packets of each of the P applications, and Table 4 shows a schematic structural diagram of a sample that is obtained after target parameters are extracted from two data packets. Table 3 and Table 4 show a case in which one sample is obtained by extracting target parameters of two data packets. If first Z/2 bytes of a first data packet of an uplink data stream and first Z/2 bytes of a first data packet of a downlink data stream of a session connection both include the target parameter, the application identification device 1 obtains the first Z/2 bytes of the first data packet of the uplink data stream of the session connection and the first Z/2 bytes of the first data packet of the downlink data stream, and combines the first Z/2 bytes of the first data packet of the uplink data stream and the first Z/2 bytes of the first data packet of the downlink data stream into Z bytes as one sample.

TABLE 3

| Target parameter | | Other data | |
|---|---|---|---|
| $1^{st}$ byte | ... $(Z/2)^{th}$ byte | ... | Last byte |

TABLE 4

| 1 sample | |
|---|---|
| First Z/2 bytes of the first data packet of an uplink data stream | First Z/2 bytes of the first data packet of a downlink data stream |
| $1^{st}$ byte ... $(Z/2)^{th}$ byte | $(Z/2 + 1)^{th}$ byte ... $Z^{th}$ byte |

Step S13: Train an initial identification model based on the M(i) samples of each of the P applications, to obtain a first application identification model, where the first application identification model is used to determine, based on a target parameter of a data packet, an application corresponding to the data packet.

Figure 3:
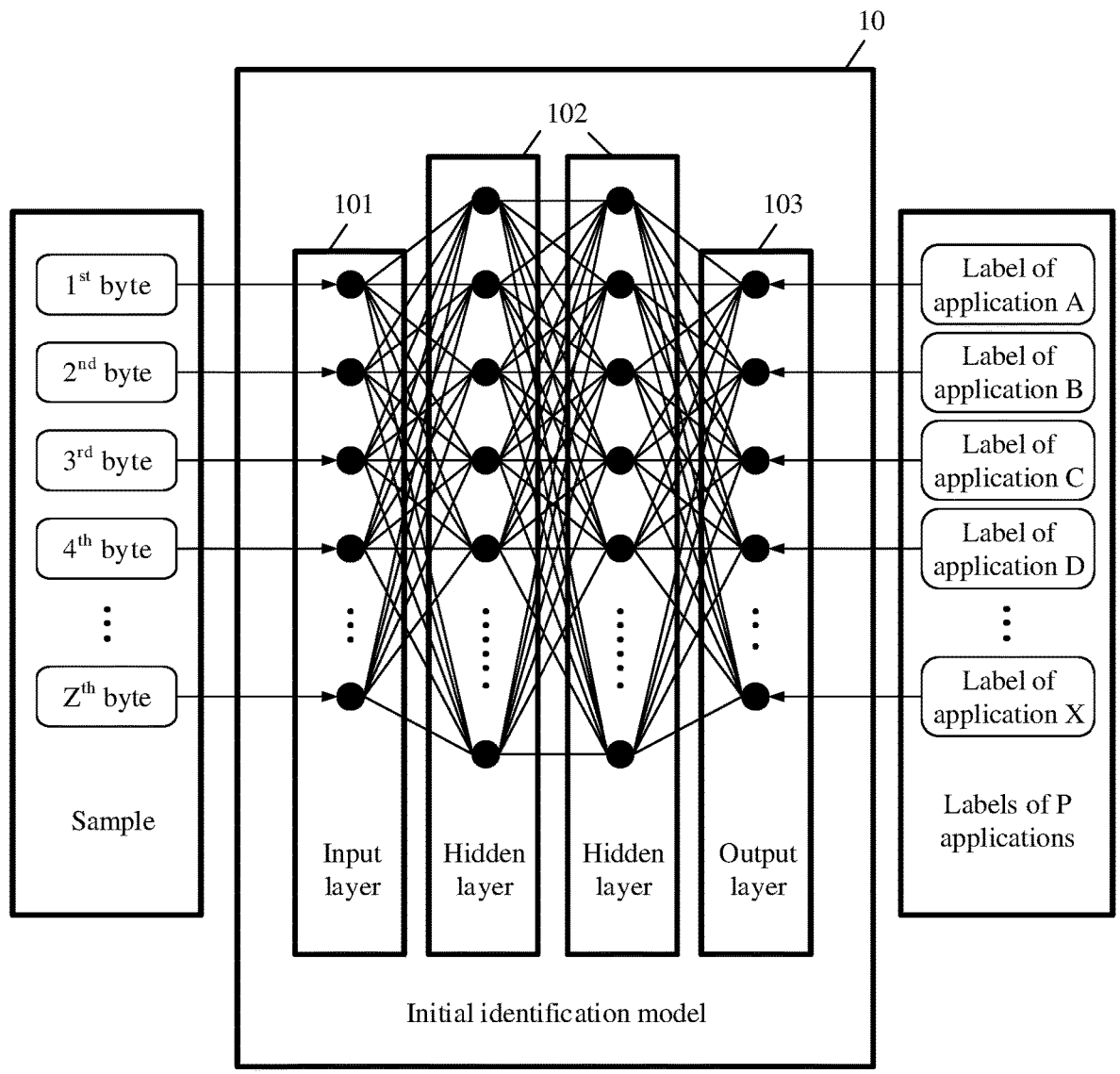
FIG. 3 is a schematic diagram of an initial identification model according to an embodiment of this application.

FIG. 3 is a schematic diagram of an initial identification model according to an embodiment of this application. In FIG. 3, the initial identification model 10 includes an input layer 101, a plurality of hidden layers 102, and an output layer 103. The initial identification model 10 inputs a mapping relationship between each sample and each application into the hidden layer 102. A function of the input layer 101 is to import M(i) samples of each of the P applications into the hidden layer 102. A function of the output layer 103 is to import a label of each of the P applications into the hidden layer 102. A function of the plurality of hidden layers 102 is to: calculate, by using several neurons in the plurality of hidden layers 102, M(i) samples of each of the P applications and the label of each of the P applications; continuously adjust a parameter of the initial identification model 10; and establish a mapping relationship between a sample and a label of an application, to convert the initial identification model 10 into the first application identification model. The first application identification model may determine, based on a target parameter of a data packet, the label of the application corresponding to the data packet.

In the embodiment shown in FIG. 3, Z bytes of each sample need to be imported to the hidden layer 102 by using the input layer 101 of the initial identification model 10, and labels of the P applications also need to be imported to the hidden layer 102 by using the output layer 103 of the initial identification model 10. The mapping relationship between each sample and the application also needs to be pre-imported into the hidden layer 102.

Figure 4:
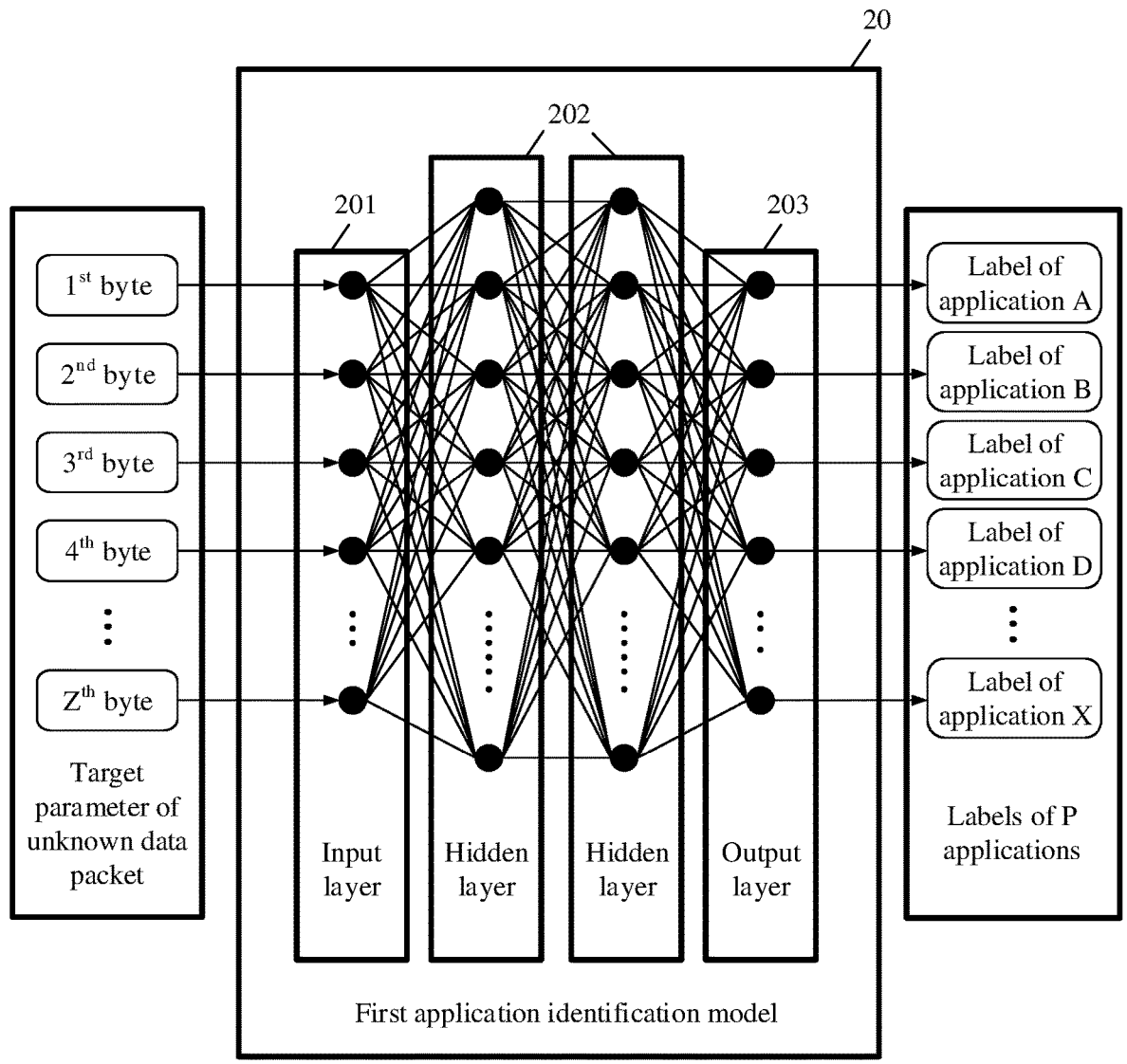
FIG. 4 is a schematic diagram of a first application identification model according to an embodiment of this application.

FIG. 4 is a schematic diagram of a first application identification model according to an embodiment of this application. In FIG. 4, a first application identification model 20 is generated based on the initial identification model 10 in FIG. 3. The first application identification model 20 includes an input layer 201, a plurality of hidden layers 202, and an output layer 203. The output layer 203 includes a label of each of P applications. When Z bytes of a target parameter of an unknown data packet are imported to the hidden layers 202 by using the input layer 201, the hidden layers 202 may determine, based on a pre-established mapping relationship between a sample and a label of an application, the label of the application corresponding to the target parameter, and the label of the application corresponding to the target parameter is output by using the output layer 203, so that which application the unknown data packet corresponds to may be known based on the output label of the application.

After step S13, the method shown in FIG. 2 may further include the following steps: obtaining a target data packet; extracting a target parameter of the target data packet; and identifying the target parameter of the target data packet by using the first application identification model, to obtain a target identification result, where the target identification result is used to indicate an application corresponding to the target data packet.

For example, with reference to FIG. 4, Z bytes of the target parameter of the unknown data packet are first obtained, and then the Z bytes are imported to the hidden layer 202 by using the input layer 201 of the first application identification model 20. The hidden layers 202 may determine, based on a pre-established mapping relationship between a sample and a label of an application, the label of the application corresponding to the target parameter, and the label of the application corresponding to the target parameter is output by using the output layer 203, so that which application the unknown data packet corresponds to may be known based on the output label of the application.

It can be learned from the embodiments shown in FIG. 2, FIG. 3, and FIG. 4 that, in this embodiment of this application, Y data packets may be obtained, M(i) samples of each of P applications are extracted from the Y data packets based on a mapping relationship between the Y data packets and the P applications, and then the initial identification model is trained based on the M(i) samples of each of the P applications to obtain the first application identification model. Therefore, in this embodiment of this application, an application corresponding to an unknown data packet may be determined by using the generated first application identification model, to accurately identify data traffic.

Figure 5:
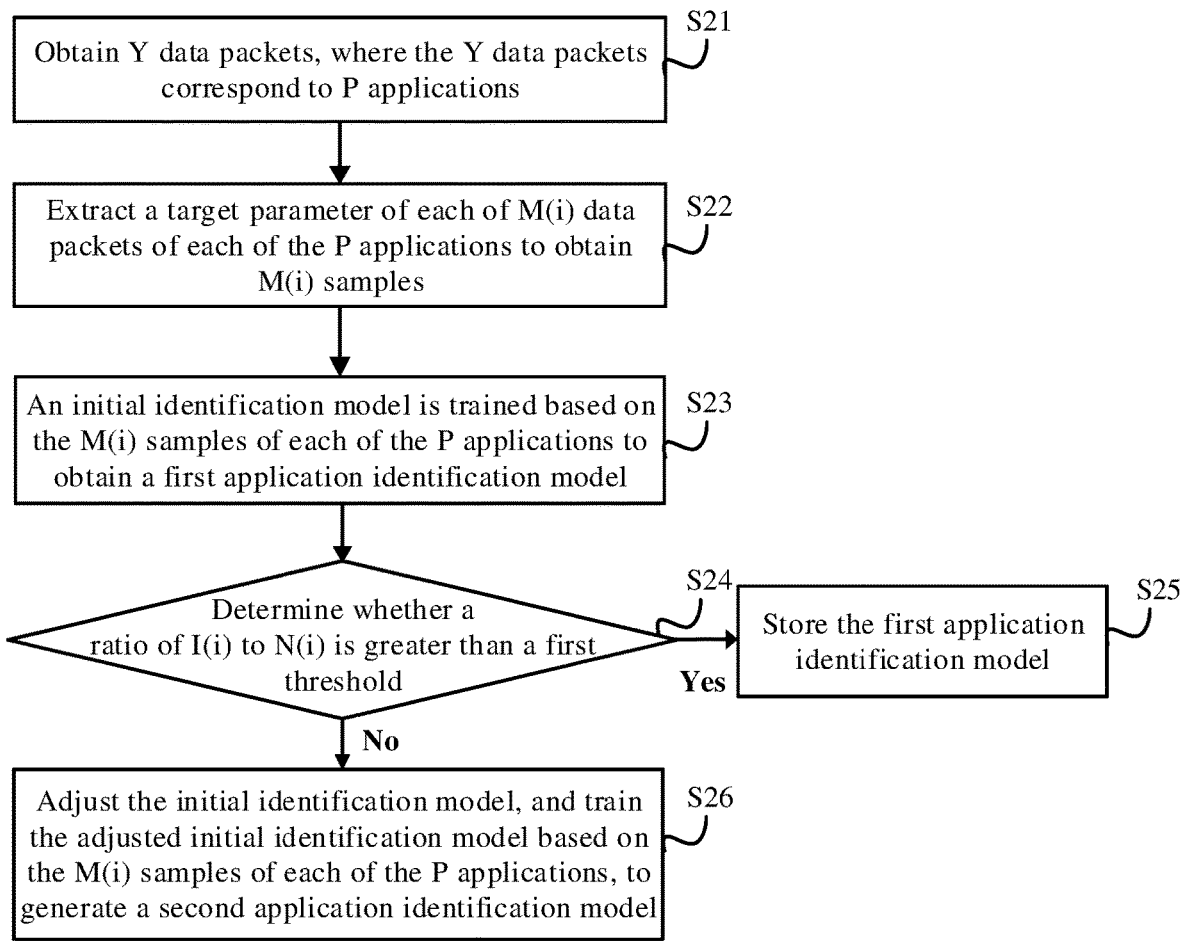
FIG. 5 is a flowchart of a method for generating another application identification model according to an embodiment of this application.

FIG. 5 is a flowchart of a method for generating another application identification model according to an embodiment of this application. The embodiment shown in FIG. 5 is a technical solution added after step S13 in FIG. 2. The method shown in FIG. 5 includes the following steps.

Step S21: Collect N(i) data packets corresponding to the $i^{th}$ application.

After the initial identification model is trained based on the M(i) samples of each of the P applications to obtain the first application identification model, to test whether the identification accuracy of the first application identification model is qualified, some test samples need to be collected for each of the P applications. For the $i^{th}$ application of the P applications, N(i) data packets may be collected.

Referring to FIG. 1, for example, it is assumed that the application identification device 1 has trained the initial identification model based on the M(i) samples of each of the P applications to obtain the application identification model 11. To test identification accuracy of the application identification model 11 and determine whether the identification accuracy is qualified, some test samples need to be collected for each of the P applications. It is assumed that P is 3, that is, there are three applications in total. In the three applications, a first application is an application A, a second application is an application B, and a third application is an application C. It is assumed that 100 data packets corresponding to the application A, 90 data packets corresponding to the application B, and 80 data packets corresponding to the application C are collected and are separately used to test the application identification model 11, that is, N(1) is 100, N(2) is 90, and N(3) is 80.

Step S22: Extract a target parameter of each of the N(i) data packets to obtain N(i) samples.

Because a process of executing step S22 is similar to a process of executing step S12, for the process of executing step S22, refer to detailed descriptions of step S12.

Step S23: Identify the N(i) samples by using the first application identification model, to obtain an identification result, where the identification result indicates that I(i) samples correspond to the $i^{th}$ application, I(i) is a positive integer, and I(i) is less than or equal to N.

Step S24: Determine whether a ratio of I(i) to N(i) is greater than a first threshold. When the ratio of I(i) to N(i) is greater than the first threshold, step S25 is performed. When the ratio of I(i) to N(i) is less than the first threshold, step S26 is performed.

The first threshold is used to indicate whether identification accuracy of the first application identification model meets a criterion.

Step S25: Store the first application identification model.

Step S26: Adjust the initial identification model, and train the adjusted initial identification model based on the M(i) samples of each of the P applications, to generate a second application identification model, where identification accuracy of the second application identification model is greater than identification accuracy of the first application identification model.

The following describes steps S23 to S26 by using an example.

For example, it is assumed that the N(i) samples of the $i^{th}$ application are 100 samples of the application A, the I(i) samples are 90 samples, and the first threshold is 95%. When the 100 samples of the application A are identified by using the first application identification model, an obtained identification result is that 90 samples correspond to the application A. It may be determined, through comparison, that a ratio 90% of I(i) to N(i) is less than a first threshold 95%, which indicates that the identification accuracy of the first application identification model does not meet the criterion. Therefore, the initial identification model needs to be adjusted, and the adjusted initial identification model needs to be trained based on the M(i) samples of each of the P applications, to generate the second application identification model. A manner of adjusting the initial identification model may be increasing a hidden layer of the initial identification model, or may be increasing a quantity of neurons at each hidden layer in the initial identification model. Both two manners may increase identification accuracy of the second application identification model, and therefore identification accuracy of the newly generated second application identification model is greater than identification accuracy of the first application identification model.

For another example, it is assumed that the N(i) samples of the $i^{th}$ application are 100 samples of the application A, the I(i) samples are 98 samples, and the first threshold is 95%. When the 100 samples of the application A are identified by using the first application identification model, an obtained identification result is that 98 samples correspond to the application A. It may be determined, through comparison, that a ratio 98% of I(i) to N(i) is greater than a first threshold 95%, which indicates that the identification accuracy of the first application identification model meets the criterion, and therefore, the first application identification model may be stored.

It can be learned from the embodiment shown in FIG. 5 that, in this embodiment of this application, identification accuracy of the first application identification model may be tested. If the identification accuracy of the first application identification model meets a criterion, the first application identification model is stored. If the identification accuracy of the first application identification model does not meet the criterion, the initial identification model is adjusted, and the adjusted initial identification model is trained based on the M(i) samples of each of the P applications, to generate the second application identification model. In this way, the second application identification model with higher identification accuracy can be obtained. Therefore, in this embodiment of this application, the initial identification model may be adjusted based on an actual requirement, to generate the second application identification model with higher identification accuracy.

In the embodiment shown in FIG. 5, identification accuracy of each of the P applications in the first application identification model may be separately tested. If identification accuracy of F applications in the P applications in the first application identification model is comparatively low, it is determined whether a ratio of F to P is greater than a preset threshold. If the ratio of F to P is greater than the preset threshold, it indicates that the identification accuracy of the first application identification model is comparatively low, and a second application identification model with higher identification accuracy may be generated. If the ratio of F to P is less than the preset threshold, it indicates that the identification accuracy of the first application identification model meets a requirement, and the first application identification model may be stored. Therefore, in this embodiment of this application, the second application identification model with higher identification accuracy may be generated by adjusting the initial identification model.

Figure 6:
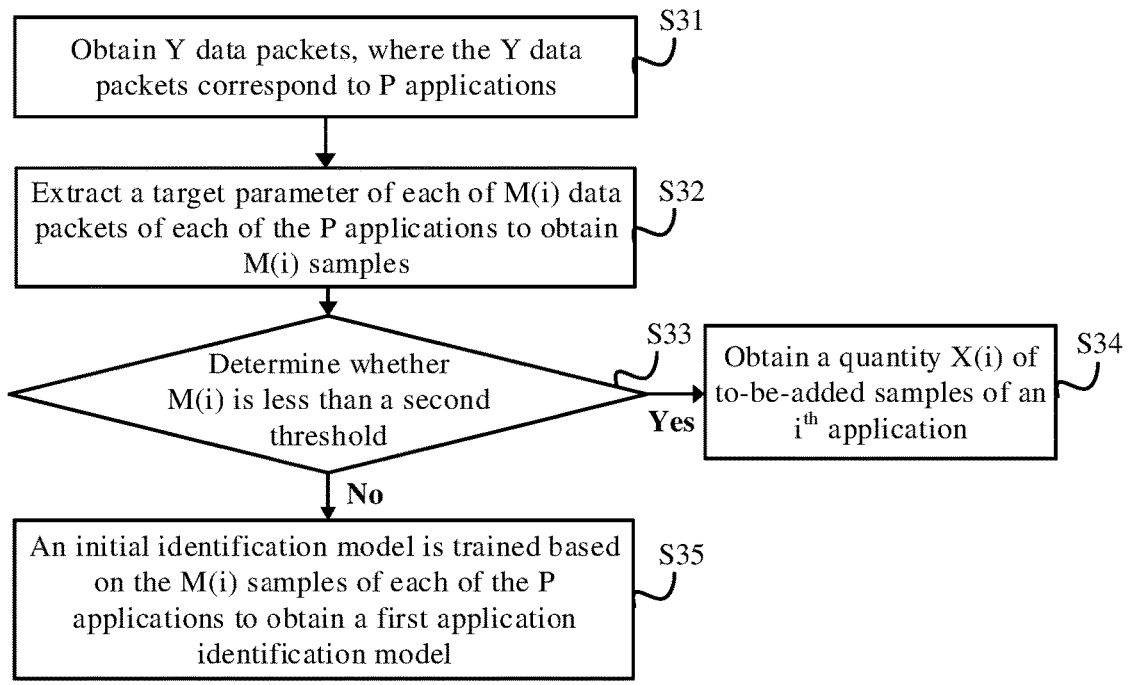
FIG. 6 is a flowchart of a method for generating yet another application identification model according to an embodiment of this application.

FIG. 6 is a flowchart of still another method for generating another application identification model according to an embodiment of this application. The method shown in FIG. 6 includes the following steps.

Step S31: Obtain Y data packets, where the Y data packets correspond to P applications, an $i^{th}$ application in the P applications corresponds to M(i) data packets, and $Y = \Sigma_{i=1}^{P} M(i)$, $1 \leq i \leq P$.

Because a process of executing step S31 is similar to a process of executing step S11, for the process of executing step S31, refer to detailed descriptions of step S11.

Step S32: Extract a target parameter of each of the M(i) data packets of each of the P applications to obtain M(i) samples, where the target parameter indicates information about a session connection established between the $i^{th}$ application and a server that provides the $i^{th}$ application.

Because a process of executing step S32 is similar to a process of executing step S12, for the process of executing step S32, refer to detailed descriptions of step S12.

Step S33: Determine whether M(i) is less than a second threshold, where the second threshold is used to determine whether a new sample needs to be added to the $i^{th}$ application. When M(i) is less than the second threshold, step S34 is performed. When M(i) is greater than the second threshold, step S35 is performed.

After the target parameter of each of the M(i) data packets of each of the P applications is extracted to obtain the M(i) samples, it needs to be determined whether M(i) is less than a second threshold. If M(i) is less than the second threshold, it indicates that a quantity of samples of the $i^{th}$ application is comparatively small. Therefore, step S34 needs to be performed to increase the quantity of samples of the $i^{th}$ application, and then the initial identification model is trained based on the M(i) samples of each of the P applications, to obtain the first application identification model. If M(i) is greater than the second threshold, it indicates that the quantity of samples of the $i^{th}$ application meets a requirement. Therefore, step S35 needs to be performed, to train the initial identification model based on the M(i) samples of each of the P applications, to obtain the first application identification model.

Step S34: Obtain a quantity X(i) of to-be-added samples of the $i^{th}$ application, where X(i) is a positive integer; generate X(i) new samples of the $i^{th}$ application based on the M(i) samples; and train the initial recognition model based on the M(i) samples of each of the P applications and the X(i) new samples, to obtain the first application recognition model.

Step S35: Train the initial identification model based on the M(i) samples of each of the P applications, to obtain the first application identification model.

The following describes steps S33 to S35 by using an example.

For example, it is assumed that the M(i) samples of the $i^{th}$ application are 200 samples of the application A, the X(i) samples of the $i^{th}$ application are 400 samples, and the second threshold is 350. When the quantity of samples of the application A is 200, it may be learned through determining that the 200 samples of the application A are less than the second threshold 350, which indicates that the quantity of samples of the application A is comparatively small, and the quantity of samples of the application A needs to be increased. Then, the quantity 400 of to-be-added samples of the application A is obtained, 400 new samples are generated based on the 200 samples of the application A, and the initial identification model is trained based on the M(i) samples and the X(i) new samples of each of the P applications, to obtain the first application identification model.

For another example, it is assumed that the M(i) samples of the $i^{th}$ application are 800 samples of the application A, the X(i) samples of the $i^{th}$ application are 400 samples, and the second threshold is 350. When the quantity of samples of the application A is 800, it may be learned through determining that the 800 samples of the application A are greater than the second threshold 350, which indicates that the quantity of samples of the application A meets a requirement, and the quantity of samples of the application A does not need to be increased. At this time, the initial identification model may be trained based on the M(i) samples of each of the P applications, to obtain the first application identification model.

In the embodiment shown in FIG. 6, applications with a comparatively small quantity of samples can be detected from the P applications, and the quantity of samples of these applications is increased, to ensure that the quantity of samples for training the initial identification model meets a requirement.

In step S34, the generating X(i) new samples of the $i^{th}$ application based on the M(i) samples may be specifically: generating X(i)/M(i) new samples for each sample of the M(i) samples, to obtain X(i) new samples.

For example, it is assumed that the M(i) samples of the $i^{th}$ application are 200 samples of the application A, the X(i) new samples are 400 new samples, and X(i)/M(i) is 400/200, that is, X(i)/M(i) is 2. To generate the 400 new samples by using the 200 samples of the application A, each of the 200 samples of the application A need to generate two new samples. In this way, the 400 new samples can be generated.

The foregoing step "generating X(i)/M(i) new samples for each sample of the M(i) samples" may further include the following steps: using each of the M(i) samples as a reference sample; obtaining, from the M(i) samples, X(i)/M(i) samples having a minimum hamming distance from the reference sample; and generating X(i)/M(i) new samples corresponding to the reference sample based on the reference sample and the X(i)/M(i) samples.

For example, it is assumed that the M(i) samples of the $i^{th}$ application are 200 samples of the application A, the X(i) new samples are 400 new samples, and X(i)/M(i) is 400/200, that is, X(i)/M(i) is 2. To ensure that each of the 200 samples of the application A can generate two new samples, first, each of the 200 samples is used as a reference sample, to obtain 200 reference samples. Then, the following two steps are separately performed for the 200 reference sample: obtaining, from the 200 samples, two samples that have a minimum hamming distance from one reference sample, and generating, based on the reference sample and the two samples, two new samples corresponding to the reference sample. Because the quantity of the reference samples is 200, 400 new samples may be obtained after the foregoing steps are performed.

In step S34, the quantity X(i) of to-be-added samples of the $i^{th}$ application is obtained in the following three manners.

In a first manner, a preset quantity X(i) of to-be-added samples is obtained.

In the first manner, the quantity X(i) of to-be-added samples may be preset, and when M(i) is less than the second threshold, the quantity X(i) of to-be-added samples may be directly obtained.

For example, it is assumed that the quantity X(i) of to-be-added samples is preset to 400, and when M(i) is less than the second threshold, the quantity 400 of to-be-added samples may be directly obtained.

In a second manner, a preset third threshold is obtained, and a difference between the third threshold and M(i) is calculated to obtain the quantity X(i) of to-be-added samples of the $i^{th}$ application, where the third threshold indicates a minimum quantity of required samples for generating the application identification model.

In the second manner, a minimum quantity of required samples of an application may be preset, that is, the third threshold may be preset. When M(i) is less than the second threshold, the minimum quantity of required samples of an application may be obtained, that is, the third threshold is obtained. Because the $i^{th}$ application has M(i) samples already, the quantity X(i) of to-be-added samples is a difference between the third threshold and M(i).

For example, it is assumed that the third threshold is preset to 600, and M(i) is 200. When M(i) is 200 and is less than the second threshold, the third threshold 600 may be obtained, and then a difference between the third threshold 600 and M(i) 200 may be calculated to obtain the quantity X(i) 400 of to-be-added samples.

In a third manner, an average quantity Y/P of data packets of each of the P applications and an expected ratio R(i) of the $i^{th}$ application are determined, where the expected ratio R(i) is used to indicate a ratio of an expected quantity E(i) of samples of the $i^{th}$ application to the average quantity Y/P of the data packets of each application. The expected quantity E(i) of samples of the $i^{th}$ application is calculated based on the average quantity Y/P of the data packets of each of the P applications and the expected ratio R(i) of the $i^{th}$ application. A difference between E(i) and M(i) is calculated to obtain the quantity X(i) of to-be-added samples of the $i^{th}$ application.

In the third manner, the expected ratio R(i) of the $i^{th}$ application may be preset. When M(i) is less than the second threshold, an average quantity Y/P of data packets of each of the P applications may be calculated, an expected quantity E(i) of samples of the $i^{th}$ application may be calculated based on Y/P and R(i), and then a difference of E(i) and M are calculated, to obtain a quantity X(i) of to-be-added samples of the $i^{th}$ application.

For example, it is assumed that the expected ratio R(i) of the $i^{th}$ application is preset to 0.90, M(i) is 300, Y data packets are 2800 data packets, P applications are 4 applications, and the second threshold is 0.5×Y/P=350. When M(i) 200 is less than the second threshold 350, an average quantity Y/P of data packets of each of the four applications may be calculated as 700, an expected quantity E(i) of samples of the $i^{th}$ application may be calculated as 630 based on 700 and 0.9, and then a difference between E(i) 630 and M(i) 300 is calculated, to obtain a quantity X(i) 330 of to-be-added samples of the $i^{th}$ application.

Figure 7:
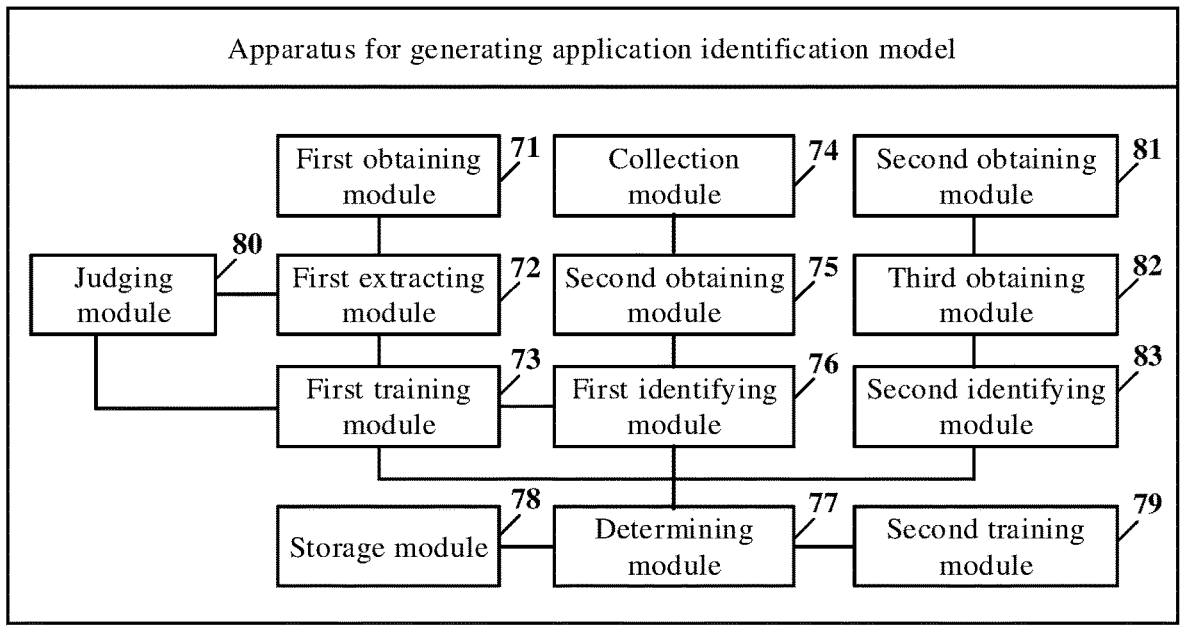
FIG. 7 is a schematic diagram of an apparatus for generating an application identification model according to an embodiment of this application.

FIG. 7 is a schematic diagram of an apparatus for generating an application identification model according to an embodiment of this application. The apparatus for generating an application identification model includes the following modules: a first obtaining module 71, configured to obtain Y data packets, where the Y data packets correspond to P applications, an $i^{th}$ application in the P applications corresponds to M(i) data packets, and $Y=\Sigma_{i=1}^{P} M(i)$, 1≤i≤P. For a specific detailed implementation, refer to the detailed description corresponding to step S11 in the method embodiment shown in FIG. 2; a first extraction module 72, configured to extract a target parameter of each of the M(i) data packets of each of the P applications to obtain M(i) samples, where the target parameter indicates information about a session connection established between the $i^{th}$ application and a server that provides the $i^{th}$ application. For a specific detailed implementation, refer to the detailed description corresponding to step S12 in the method embodiment shown in FIG. 2; and a first training module 73, configured to train an initial identification model based on the M(i) samples of each of the P applications, to obtain a first application identification model, where the first application identification model is used to determine, based on a target parameter of a data packet, an application corresponding to the data packet. For a specific detailed implementation, refer to the detailed description corresponding to step S13 in the method embodiment shown in FIG. 2.

In an implementable embodiment, the apparatus for generating an application identification model may further include a collection module 74, a second extraction module 75, a first identification module 76, a determining module 77, a storage module 78, and a second training module 79.

The collection module 74 is configured to collect $N(i)$ data packets corresponding to the $i^{th}$ application.

The second extraction module 75 is configured to extract a target parameter of each of the $N(i)$ data packets to obtain $N(i)$ samples.

The first identification module 76 is configured to identify the $N(i)$ samples by using the first application identification model, to obtain an identification result, where the identification result indicates that $I(i)$ samples correspond to the $i^{th}$ application, $I(i)$ is a positive integer, and $I(i)$ is less than or equal to N.

The determining module 77 is configured to determine whether a ratio of $I(i)$ to $N(i)$ is greater than a first threshold.

The storage module 78 is configured to: when the ratio of $I(i)$ to $N(i)$ is greater than the first threshold, store the first application identification model.

The second training module 79 is configured to: when the ratio of $I(i)$ to $N(i)$ is less than the first threshold, adjust the initial identification model, and train the adjusted initial identification model based on the $M(i)$ samples of each of the P applications, to generate a second application identification model, where identification accuracy of the second application identification model is greater than identification accuracy of the first application identification model.

For implementations of the collection module 74, the second extraction module 75, the first identification module 76, the determining module 77, the storage module 78, and the second training module 79, refer to detailed descriptions corresponding to steps S21 to S26 in the method embodiment shown in FIG. 5.

In an implementable embodiment, the apparatus for generating an application identification model may further include a judging module 80.

The judging module 80 is configured to determine whether $M(i)$ is less than a second threshold, where the second threshold is used to determine whether a new sample needs to be added to the $i^{th}$ application.

In addition, the first training module 73 is specifically configured to: when $M(i)$ is less than the second threshold, obtain a quantity $X(i)$ of to-be-added samples of the $i^{th}$ application, where $X(i)$ is a positive integer; generate $X(i)$ new samples of the $i^{th}$ application based on the $M(i)$ samples; and train the initial recognition model based on the $M(i)$ samples of each of the P applications and the $X(i)$ new samples, to obtain the first application recognition model; or when $M(i)$ is greater than the second threshold, train the initial identification model based on the $M(i)$ samples of each of the P applications, to obtain the first application identification model.

For implementations of the judging module 80 and the first training module 73, refer to detailed descriptions corresponding to steps S33 to S35 in the method embodiment shown in FIG. 6.

In an implementable embodiment, the first training module 73 is specifically configured to generate $X(i)/M(i)$ new samples for each sample of the $M(i)$ samples to obtain the $X(i)$ new samples.

The first training module 73 is specifically configured to: use each of the $M(i)$ samples as a reference sample; obtain, from the $M(i)$ samples, $X(i)/M(i)$ samples having a minimum hamming distance from the reference sample; and generate $X(i)/M(i)$ new samples corresponding to the reference sample based on the reference sample and the $X(i)/M(i)$ samples.

For an implementation of the first training module 73, refer to corresponding detailed descriptions in the method embodiment shown in FIG. 6.

In an implementable embodiment, the first training module 73 is specifically configured to obtain a preset quantity $X(i)$ of to-be-added samples. Alternatively, the first training module 73 is specifically configured to: obtain a preset third threshold, and calculate a difference between the third threshold and $M(i)$ to obtain the quantity $X(i)$ of to-be-added samples of the $i^{th}$ application, where the third threshold indicates a minimum quantity of required samples for generating the application identification model. Alternatively, the first training module 73 is specifically configured to: determine an average quantity $Y/P$ of data packets of each of the P applications and an expected ratio $R(i)$ of the $i^{th}$ application, where the expected ratio $R(i)$ is used to indicate a ratio of an expected quantity $E(i)$ of samples of the $i^{th}$ application to the average quantity $Y/P$ of the data packets of each application; calculate the expected quantity $E(i)$ of samples of the $i^{th}$ application based on the average quantity $Y/P$ of the data packets of each of the P applications and the expected ratio $R(i)$ of the $i^{th}$ application; and calculate a difference between $E(i)$ and $M(i)$ to obtain the quantity $X(i)$ of to-be-added samples of the $i^{th}$ application.

For an implementation of the first training module 73, refer to corresponding detailed descriptions in the method embodiment shown in FIG. 6.

In an implementable embodiment, the apparatus for generating an application identification model may further include a second obtaining module 81, a third extracting module 82, and a second identification module 83.

The second obtaining module 81 is configured to obtain a target data packet.

The third extraction module 82 is configured to extract a target parameter from the target data packet.

The second identification module 83 is configured to identify the target parameter of the target data packet by using the first application identification model, to obtain a target identification result, where the target identification result is used to indicate an application corresponding to the target data packet.

For implementations of the second obtaining module 81, the third extracting module 82, and the second identifying module 83, refer to corresponding detailed descriptions in the method embodiment shown in FIG. 2.

Figure 8:
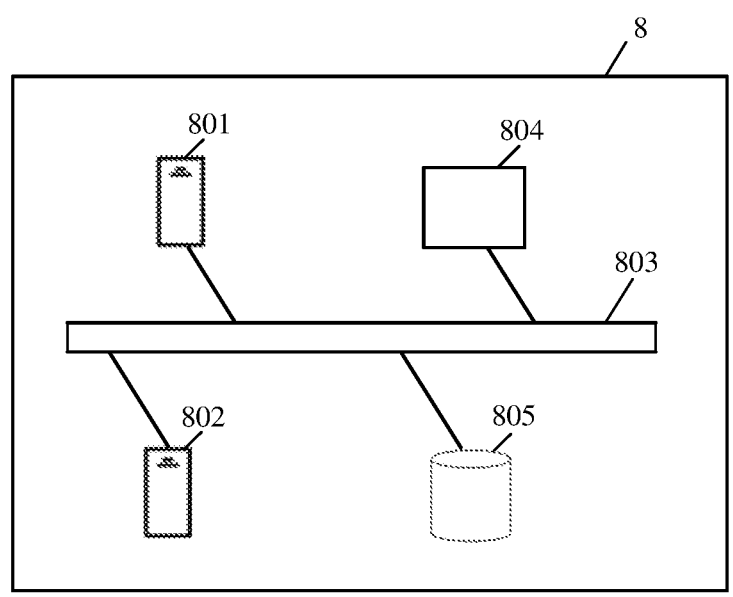
FIG. 8 is a schematic diagram of a network device according to an embodiment of this application.

FIG. 8 is a schematic diagram of a network device according to an embodiment of this application. The network device 8 includes a central processing unit 801, an image processor 802, an I/O device 803, a memory 804, and a memory 805. The memory 804 may be a random access memory (random access memory, RAM), and the memory 805 may be a non-volatile memory (non-volatile memory, NVM). The network device 8 in FIG. 8 is equivalent to the application identification device 1 in FIG. 1. For a detailed description of the network device 8 in FIG. 8, refer to the detailed description of the application identification device 1 in the embodiment corresponding to FIG. 1.

The network device 8 shown in FIG. 8 may use the method for generating an application identification model in the embodiment corresponding to FIG. 2. With reference to FIG. 2 and FIG. 8, the central processing unit 801 and the image processor 802 may train the $M(i)$ samples of each of the P applications and the initial identification model in the memory 804, to obtain the first application identification model, and transmit the obtained first application identification model to the memory 805 by using the I/O device 803.

The memory 805 may further store a program instruction, and the central processing unit 801 invokes the program instruction, to implement the foregoing method embodiments of the present application. The image processor 802 is configured to accelerate an algorithm executed by the central processing unit 801 when the initial identification model is trained.

In the network device 8 shown in FIG. 8, when the performance of the central processing unit 801 and the performance of the image processor 802 are better, the speed of training the M(i) samples and the initial identification model of each of the P applications to obtain the first application identification model is higher, and the speed of identifying the target parameter of the unknown data packet by using the first application identification model is faster. In another implementation, the network device 8 may further not include the image processor 802.

What is claimed is:

1. A method, comprising:
obtaining Y data packets, wherein the Y data packets correspond to P applications, for each integer value of i from 1 to P, an $i^{th}$ application in the P applications corresponds to M(i) data packets of the Y data packets, and $Y=\Sigma_{i=1}^{P}M(i)$;
extracting a first target parameter of each of the M(i) data packets of each of the P applications, to obtain M(i) samples of each of the P applications, wherein for each sample of the M(i) samples of each of the P applications, the first target parameter of the respective sample indicates information about a session connection established between the $i^{th}$ application corresponding to the respective sample and a server that provides the $i^{th}$ application corresponding to the respective sample; and
training an initial identification model based on the M(i) samples of each of the P applications, to obtain a first application identification model, wherein the first application identification model is usable to determine, based on a second target parameter of a data packet, an application corresponding to the data packet.

2. The method according to claim 1, wherein after training the initial identification model based on the M(i) samples of each of the P applications, to obtain the first application identification model, the method further comprises:
for each integer value of i from 1 to P, collecting N(i) data packets corresponding to the $i^{th}$ application;
extracting a third target parameter of each of the N(i) data packets of each of the P applications, to obtain N(i) samples of each of the P applications;
identifying the N(i) samples of each of the P applications using the first application identification model, to obtain an identification result of each of the P applications, wherein, for each integer value of i from 1 to P, the identification result of the $i^{th}$ application indicates that I(i) samples correspond to the $i^{th}$ application, I(i) is a positive integer, and I(i) is less than or equal to N;
for each integer value of i from 1 to P, determining whether a ratio of I(i) to N(i) is greater than a first threshold;
when each ratio of I(i) to N(i) of the P applications is greater than the first threshold, storing the first application identification model; and
when at least one ratio of I(i) to N(i) of the P applications is less than the first threshold, adjusting the initial identification model, and training the adjusted initial identification model based on the M(i) samples of each of the P applications, to generate a second application identification model, wherein identification accuracy of the second application identification model is greater than identification accuracy of the first application identification model.

3. The method according to claim 2, wherein after extracting the first target parameter of each of the M(i) data packets of each of the P applications, to obtain the M(i) samples of each of the P applications, the method further comprises:
for each of the P applications, determining whether the M(i) samples of the respective application are less than a second threshold, wherein the second threshold is used to determine whether a new sample needs to be added to the respective application; and
wherein training the initial identification model based on the M(i) samples of each of the P applications, to obtain the first application identification model, comprises, for each integer value of i from 1 to P:
when M(i) of the $i^{th}$ application is less than the second threshold, obtaining a quantity X(i) of to-be-added samples of the $i^{th}$ application, wherein X(i) is a positive integer; generating X(i) new samples of the $i^{th}$ application based on the M(i) samples of the $i^{th}$ application; and training the initial recognition model based on the M(i) samples of the $i^{th}$ application and the X(i) new samples, to obtain the first application recognition model; or
when M(i) of the $i^{th}$ application is greater than the second threshold, training the initial identification model based on the M(i) samples of the $i^{th}$ application, to obtain the first application identification model.

4. The method according to claim 3, wherein generating the X(i) new samples of the $i^{th}$ application based on the M(i) samples of the $i^{th}$ application comprises:
generating X(i)/M(i) new samples for each sample of the M(i) samples of the $i^{th}$ application, to obtain the X(i) new samples of the $i^{th}$ application;
wherein generating the X(i)/M(i) new samples for each sample of the M(i) samples of the $i^{th}$ application comprises:
using each sample of the M(i) samples of the $i^{th}$ application as a reference sample;
obtaining, from the M(i) samples of the $i^{th}$ application, X(i)/M(i) samples having a minimum hamming distance from a reference sample of the reference samples; and
generating, based on the reference samples and the X(i)/M(i) samples, X(i)/M(i) new samples corresponding to the reference samples.

5. The method according to claim 3, wherein obtaining the quantity X(i) of to-be-added samples of the $i^{th}$ application comprises:
obtaining a preset quantity X(i) of to-be-added samples of the $i^{th}$ application;
obtaining a preset third threshold, and calculating a difference between the third threshold and M(i) of the $i^{th}$ application, to obtain the quantity X(i) of to-be-added samples of the $i^{th}$ application, wherein the third threshold indicates a minimum quantity of required samples for generating the application identification model; or
obtaining the quantity X(i) of to-be-added samples of the $i^{th}$ application by:
determining an average quantity Y/P of data packets of each of the P applications and an expected ratio R(i) of the $i^{th}$ application, wherein the expected ratio R(i) is used to indicate a ratio of an expected quantity E(i) of samples of the $i^{th}$ application to the average quantity Y/P of the data packets of each application;
calculating the expected quantity E(i) of samples of the $i^{th}$ application based on the average quantity Y/P of the data packets of each of the P applications and the expected ratio R(i) of the $i^{th}$ application; and calculating a difference between E(i) and M(i) to obtain the quantity X(i) of to-be-added samples of the $i^{th}$ application.

6. The method according to claim 1, wherein after training the initial identification model based on the M(i) samples of each of the P applications, to obtain the first application identification model, the method further comprises:

obtaining a target data packet;

extracting a third target parameter of the target data packet; and identifying the third target parameter of the target data packet by using the first application identification model, to obtain a target identification result, wherein the target identification result indicates an application corresponding to the target data packet.

7. The method according to claim 1, wherein after extracting the first target parameter of each of the M(i) data packets of each of the P applications to obtain M(i) samples of each of the P applications, the method further comprises:

for each of the P applications, determining whether M(i) of the respective application is less than a second threshold, wherein the second threshold is used to determine whether a new sample needs to be added to the respective application; and wherein training the initial identification model based on the M(i) samples of each of the P applications, to obtain the first application identification model, comprises, for each integer value of i from 1 to P:

when M(i) of the $i^{th}$ application is less than the second threshold, obtaining a quantity X(i) of to-be-added samples of the $i^{th}$ application, wherein X(i) is a positive integer; generating X(i) new samples of the $i^{th}$ application based on the M(i) samples of the $i^{th}$ application; and training the initial recognition model based on the M(i) samples of each of the P applications and the X(i) new samples, to obtain the first application recognition model; or when M(i) of the $i^{th}$ application is greater than the second threshold, training the initial identification model based on the M(i) samples of the $i^{th}$ application, to obtain the first application identification model.

8. The method according to claim 7, wherein generating the X(i) new samples of the $i^{th}$ application based on the M(i) samples of the $i^{th}$ application, comprises:

generating X(i)/M(i) new samples for each sample of the M(i) samples of the $i^{th}$ application, to obtain the X(i) new samples of the $i^{th}$ application;

wherein generating the X(i)/M(i) new samples for each sample of the M(i) samples of the $i^{th}$ application comprises:

using each sample of the M(i) samples of the $i^{th}$ application as a reference sample;

obtaining, from the M(i) samples of the $i^{th}$ application, X(i)/M(i) samples having a minimum hamming distance from a reference sample of the reference samples; and generating, based on the reference samples and the X(i)/M(i) samples, X(i)/M(i) new samples corresponding to the reference samples.

9. An apparatus, comprising:

a non-transitory memory, configured to store program codes; and a processor, configured to:

obtain Y data packets, wherein the Y data packets correspond to P applications, for each integer value of i from 1 to P, an $i^{th}$ application in the P applications corresponds to M(i) data packets, and $Y=\Sigma_{i=1}^{P} M(i)$;

extract a first target parameter of each of the M(i) data packets of each of the P applications, to obtain M(i) samples of each of the P applications, wherein for each sample of the M(i) samples of each of the P applications, the first target parameter of the respective sample indicates information about a session connection established between the $i^{th}$ application corresponding to the respective sample and a server that provides the $i^{th}$ application corresponding to the respective sample; and train an initial identification model based on the M(i) samples of each of the P applications, to obtain a first application identification model, wherein the first application identification model is usable to determine, based on a second target parameter of a data packet, an application corresponding to the data packet.

10. The apparatus according to claim 9, wherein the processor is further configured to:

after training the initial identification model based on the M(i) samples of each of the P applications, to obtain the first application identification model:

for each integer value of i from 1 to P, collecting N(i) data packets corresponding to the $i^{th}$ application;

extracting a third target parameter of each of the N(i) data packets of each of the P applications, to obtain N(i) samples of each of the P applications;

identifying the N(i) samples of each of the P applications by using the first application identification model, to obtain an identification result of each of the P applications, wherein, for each integer value of i from 1 to P, the identification result of the $i^{th}$ application indicates that I(i) samples correspond to the $i^{th}$ application, I(i) is a positive integer, and I(i) is less than or equal to N;

for each integer value of i from 1 to P, determining whether a ratio of I(i) to N(i) is greater than a first threshold;

when each ratio of I(i) to N(i) of the P applications is greater than the first threshold, storing the first application identification model; and when at least one ratio of I(i) to N(i) of the P applications is less than the first threshold, adjusting the initial identification model, and training the adjusted initial identification model based on the M(i) samples of each of the P applications, to generate a second application identification model, wherein identification accuracy of the second application identification model is greater than identification accuracy of the first application identification model.

11. The apparatus according to claim 10, wherein the processor is further configured to:

after extracting the target parameter of each of the M(i) data packets of each of the P applications to obtain the M(i) samples of each of the P applications, determining, for each of the P applications, whether M(i) of the respective application is less than a second threshold, wherein the second threshold is used to determine whether a new sample needs to be added to the respective application; and wherein training the initial identification model based on the M(i) samples of each of the P applications, to obtain the first application identification model, comprises, for each integer value of i from 1 to P:

when M(i) of the $i^{th}$ application is less than the second threshold, obtaining a quantity X(i) of to-be-added samples of the $i^{th}$ application, wherein X(i) is a positive integer; generating X(i) new samples of the $i^{th}$ application based on the M(i) samples of the $i^{th}$ application; and training the initial recognition model based on the M(i) samples of each of the P applications and the X(i) new samples, to obtain the first application recognition model; or when M(i) of the $i^{th}$ application is greater than the second threshold, training the initial identification model based on the M(i) samples of each of the P applications, to obtain the first application identification model.

12. The apparatus for generating an application identification model according to claim 11, wherein generating the X(i) new samples of the $i^{th}$ application based on the M(i) samples of the $i^{th}$ application comprises:

generating X(i)/M(i) new samples for each sample of the M(i) samples of the $i^{th}$ application, to obtain the X(i) new samples of the $i^{th}$ application;

wherein generating the X(i)/M(i) new samples for each sample of the M(i) samples of the $i^{th}$ application comprises:

using each sample of the M(i) samples of the $i^{th}$ application as a reference sample;

obtaining, from the M(i) samples, X(i)/M(i) samples having a minimum hamming distance from a reference sample of the reference samples; and generating, based on the reference samples and the X(i)/M(i) samples, X(i)/M(i) new samples corresponding to the reference samples.

13. The apparatus according to claim 11, wherein obtaining the quantity X(i) of to-be-added samples of the $i^{th}$ application comprises:

obtaining a preset quantity X(i) of to-be-added samples of the $i^{th}$ application;

obtaining a preset third threshold, and calculating a difference between the third threshold and M(i) of the $i^{th}$ application, to obtain the quantity X(i) of to-be-added samples of the $i^{th}$ application, wherein the third threshold indicates a minimum quantity of required samples for generating the application identification model; or determining an average quantity Y/P of data packets of each of the P applications and an expected ratio R(i) of the $i^{th}$ application, wherein the expected ratio R(i) is used to indicate a ratio of an expected quantity E(i) of samples of the $i^{th}$ application to the average quantity Y/P of the data packets of each application; calculating the expected quantity E(i) of samples of the $i^{th}$ application based on the average quantity Y/P of the data packets of each of the P applications and the expected ratio R(i) of the $i^{th}$ application; and calculating a difference between E(i) and M(i) to obtain the quantity X(i) of to-be-added samples of the $i^{th}$ application.

14. The apparatus according to claim 9, wherein the processor is further configured to:

obtain a target data packet;

extract a third target parameter of the target data packet; and identify the third target parameter of the target data packet by using the first application identification model, to obtain a target identification result, wherein the target identification result indicates an application corresponding to the target data packet.

15. The apparatus according to claim 9, wherein the processor is further configured to:

after extracting the target parameter of each of the M(i) data packets of each of the P applications to obtain M(i) samples, for each of the P applications, determining whether M(i) of the respective application is less than a second threshold, wherein the second threshold is used to determine whether a new sample needs to be added to the respective application; and wherein training the initial identification model based on the M(i) samples of each of the P applications, to obtain the first application identification model, comprises, for each integer value of i from 1 to P:

when M(i) of the $i^{th}$ application is less than the second threshold, obtaining a quantity X(i) of to-be-added samples of the $i^{th}$ application, wherein X(i) is a positive integer; generating X(i) new samples of the $i^{th}$ application based on the M(i) samples of the $i^{th}$ application; and training the initial recognition model based on the M(i) samples of each of the P applications and the X(i) new samples of the $i^{th}$ application, to obtain the first application recognition model; or when M(i) of the $i^{th}$ application is greater than the second threshold, training the initial identification model based on the M(i) samples of the $i^{th}$ application, to obtain the first application identification model.

16. The apparatus according to claim 15, wherein generating the X(i) new samples of the $i^{th}$ application based on the M(i) samples of the $i^{th}$ application comprises:

generating X(i)/M(i) new samples for each sample of the M(i) samples of the $i^{th}$ application, to obtain the X(i) new samples of the $i^{th}$ application;

wherein generating the X(i)/M(i) new samples for each sample of the M(i) samples of the $i^{th}$ application comprises:

using each sample of the M(i) samples of the $i^{th}$ application as a reference sample;

obtaining, from the M(i) samples of the $i^{th}$ application, X(i)/M(i) samples having a minimum hamming distance from a reference sample of the reference samples; and generating, based on the reference samples and the X(i)/M(i) samples, X(i)/M(i) new samples corresponding to the reference samples.

* * * * *